B. C. BRADLEY.
AXLES FOR SULKY AND GANG PLOWS.

No. 186,409. Patented Jan. 23, 1877.

Witnesses:
L. L. Bond.
C. A. West.

Inventor.
Byron C. Bradley.

UNITED STATES PATENT OFFICE.

BYRON C. BRADLEY, OF CHICAGO, ILLINOIS.

IMPROVEMENT IN AXLES FOR SULKY AND GANG PLOWS.

Specification forming part of Letters Patent No. 186,409, dated January 23, 1877; application filed September 7, 1875.

*To all whom it may concern:*

Be it known that I, BYRON C. BRADLEY, of the city of Chicago, Cook county, State of Illinois, have invented new and useful Improvements in Axles for Sulky and Gang Plows, of which the following is a full description, reference being had to the accompanying drawings.

Figure 1:
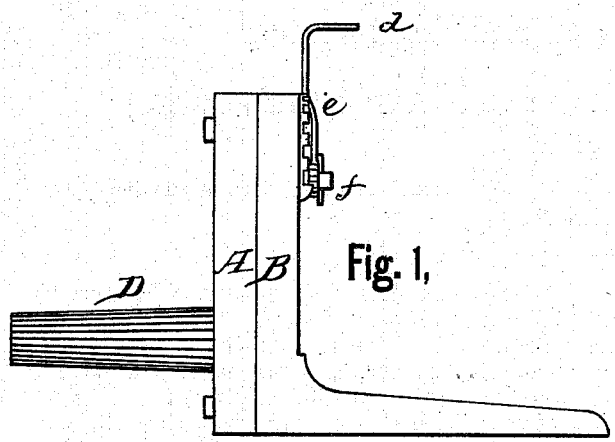
Figure 2:
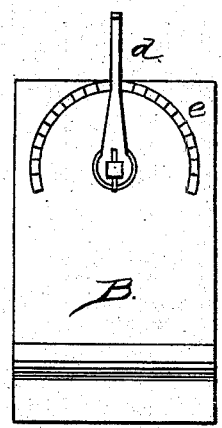
Figure 3:
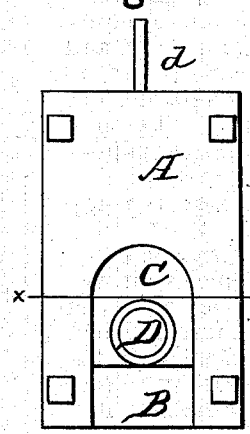
Figure 4:
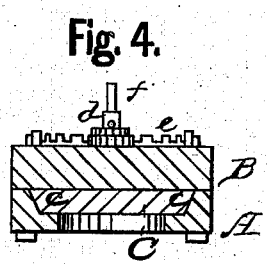
Figure 5:
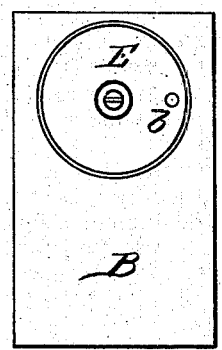
Figure 6:
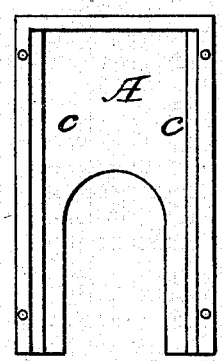
Figures 7, 8:
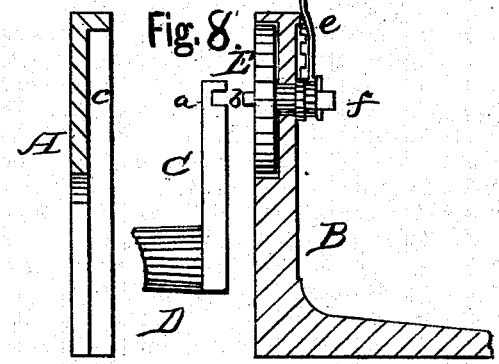

Figure 1 is a side elevation; Figs. 2 and 3, end views; Fig. 4, a cross-section; Fig. 5, an inside view of the inner plate; Fig. 6, a similar view of the outer plate; Fig. 7, a face view of the axle-plate; and Fig. 8, a vertical cross-section, the parts being separated.

The nature of this invention consists in attaching the axle bearings or spindles between two plates in such a manner as to give the axles a firm support in all directions, and in the several devices and combinations hereinafter set forth and claimed as new.

In the drawings, A represents the cap-plate; B, the angle-plate; C, the axle-plate; D, the spindle; E, the wheel or arm carrying the pin for adjusting the spindle; $a$, the groove in the axle-plate; $b$, the pin on the wheel or arm E, passing into the groove $a$; $c$, the grooves in the cap-plate; $d$, the crank or lever for turning the wheel E; $e$, the segmental ratchet-plate; $f$, the shaft to which the lever $d$ and wheel E are attached.

The plates A B are made of cast-iron; and the plate C may be made of cast malleable iron or wrought-iron, as desired.

The plate A is provided with grooves fitting over the spindle-plate C, as shown in Fig. 4, so as to give the spindle-plate a firm bearing in all directions. The plate B, on its face, is recessed to receive the wheel E, as shown in Fig. 8. It is also provided with an extension, to which the wood or metal portion of the axle proper is attached by bolts or clips, or other suitable means. A slot or groove, $a$, is made across the face of the spindle-plate C, as shown at Fig. 7. The pin $b$ on the wheel E fits into this groove $a$. The lever $d$ is in a vertical position when the pin $b$ is in the position shown at Fig. 5, so that by turning the lever in one direction the plate C, with its spindle, will be raised, and by turning it in the opposite direction it will be depressed. The pin $b$ is shown attached to a wheel for the reason that this form gives it a steadier bearing; but it is obvious that this pin may be attached to a simple arm fastened to the shaft $f$.

The plate B, at its upper end, is provided with a segmental ratchet, so as to hold the lever $d$ in any position in which it may be placed. This lever $d$, as shown, is a simple spring-lever; but it may be made of a rigid bar, and provided with a spring or spring-pawl, to engage with the ratchet. By this arrangement a firm, steady bearing is given to the spindles, and the spindles are separately adjustable, so that either wheel may be raised and lowered, which is desirable in a great many cases.

When the axle is used for sulky and gang plows, (and in some forms of plows,) it will only be necessary to apply this device to one end of the axle for adjusting the furrow-wheel and lowering the plows for other purposes. When two are used the levers $d$ may be connected to a rod, and made to operate in unison.

It is obvious that this device can be applied to the axles of mowing and reaping machines, and other classes of machines having wheels, where it is desired to raise and lower them without changing its form to any great extent.

What I claim as new is as follows:

1. The grooved plate A and plate C, provided with a journal upon its outer side to receive a wheel, and with a groove or grooves upon its inner side to receive the pin $b$, in combination with the angle-plate B, substantially as and for the purpose specified.

2. The combination of the plates A B C with the groove $a$, pin $b$, crank $d$, and ratchet $e$, substantially as set forth.

BYRON C. BRADLEY.

Witnesses:
L. L. BOND,
E. A. WEST.